Dec. 15, 1942.  L. J. ANDRESEN ET AL  2,305,128
VARIABLE SPEED FEED MECHANISM
Filed Oct. 6, 1939  5 Sheets-Sheet 1

Inventors.
Lorenz J. Andresen
and Willard E. Gerbing
Barnett & Truman
Attorneys

Dec. 15, 1942. L. J. ANDRESEN ET AL 2,305,128
VARIABLE SPEED FEED MECHANISM
Filed Oct. 6, 1939 5 Sheets-Sheet 2

Inventors
Lorenz J. Andresen
and Willard E. Gerbing
By Barnett & Truman
Attorneys.

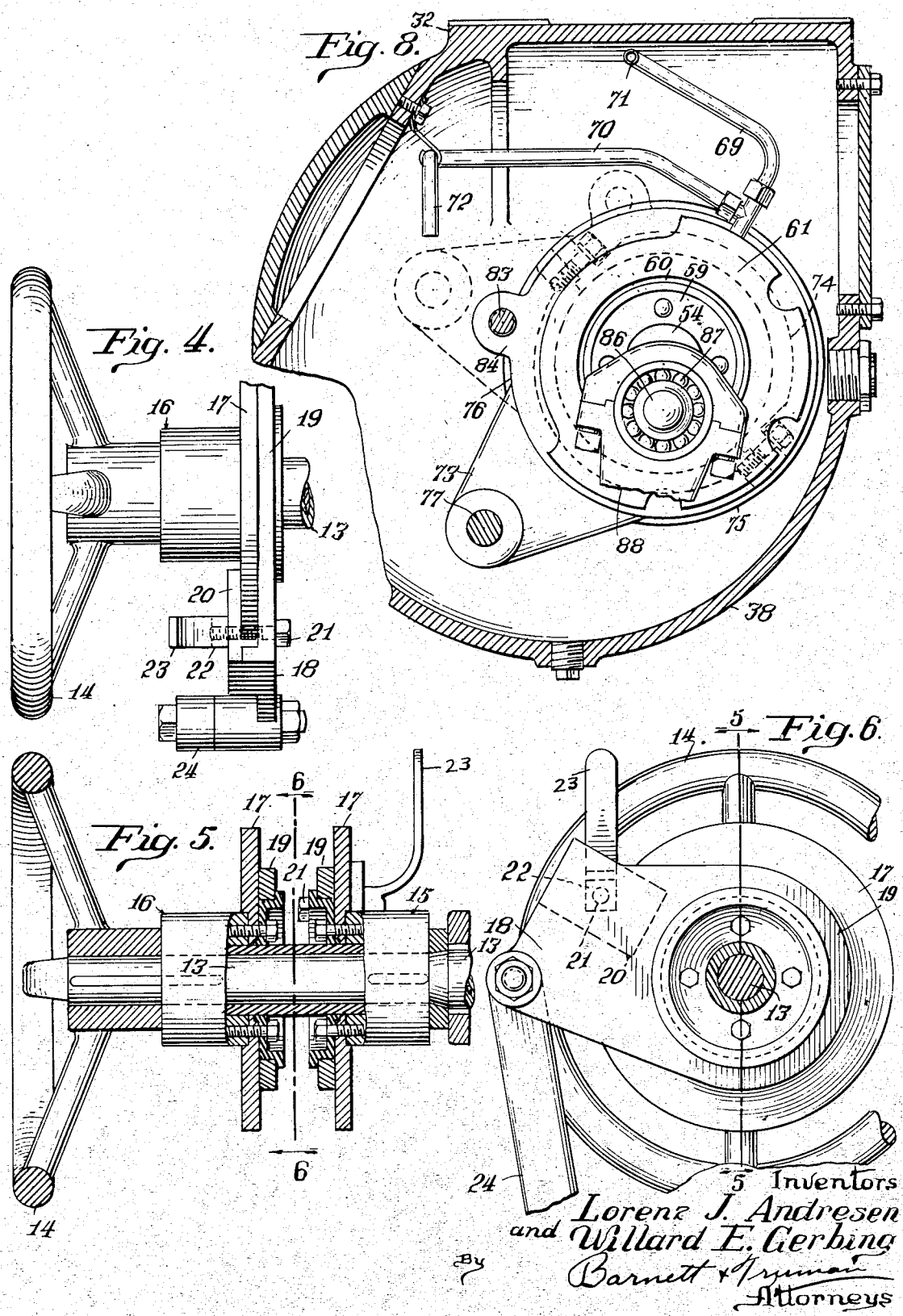

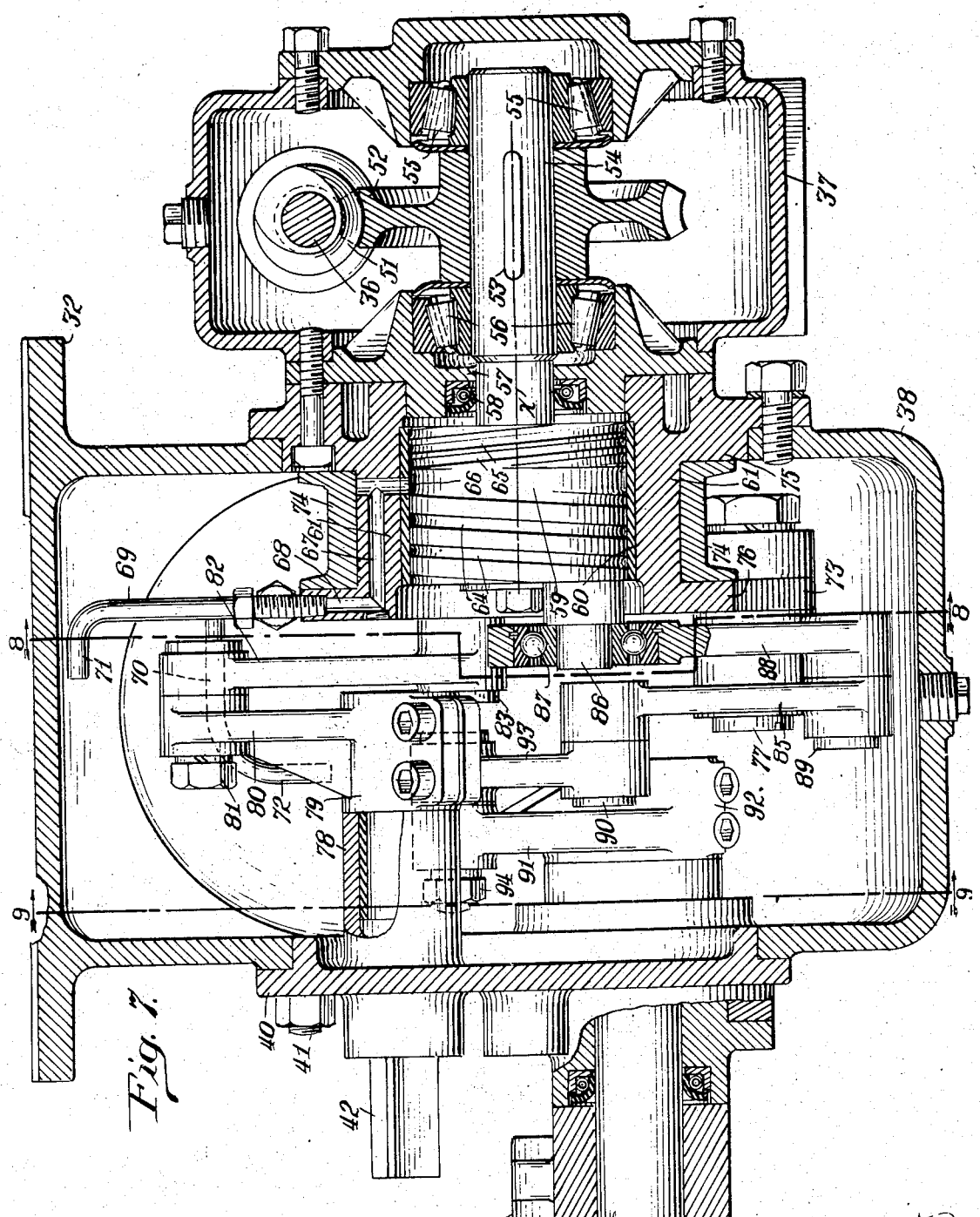

Dec. 15, 1942.      L. J. ANDRESEN ET AL      2,305,128
VARIABLE SPEED FEED MECHANISM
Filed Oct. 6, 1939       5 Sheets-Sheet 5

Inventors.
Lorenz J. Andresen
and Willard E. Gerbing
by Barnett & Truman
Attorneys Patented Dec. 15, 1942

2,305,128

UNITED STATES PATENT OFFICE 2,305,128

VARIABLE SPEED FEED MECHANISM

Lorenz J. Andresen and Willard E. Gerbing, Chicago, Ill., assignors to Combustion Engineering Company, Inc., New York, N. Y., a corporation of Delaware Application October 6, 1939, Serial No. 298,232

5 Claims. (Cl. 74—42)

This invention relates to a new and improved variable speed feed mechanism, more particularly to an improved means for driving at a slow but adjustable speed a rotary feeder for introducing material to be ground from a hopper into a mill.

It is well known in the art to provide a feed mechanism mounted at the side of a mill and communicating with an opening in the mill wall, said feed mechanism comprising a hopper into which the material to be ground is introduced, and a pocketed feeder which rotates slowly so as to introduce the material in measured quantities into the mill. This rotary feeder is driven from a small rotary motor (or other equivalent driving mechanism) through suitable speed reduction and speed-varying mechanism. According to the present invention, this mechanism comprises a substantially constant speed rotary drive shaft, and a driven shaft that is oscillated through an angle that may be varied from zero to a certain predetermined maximum number of degrees, there being a certain improved crank and linkage system between the two shafts for accomplishing this result and for varying the amplitude of oscillation of the driven shaft. In addition, means are provided for imparting a slow rotary movement in one direction to the feeder shaft, from the oscillating movement of the previously described driven shaft.

The principal object of this invention is to provide an improved variable speed feed mechanism of the type briefly described hereinabove and disclosed more in detail in the specifications which follow.

Another object is to provide an improved form of variable speed drive mechanism.

Another object is to provide an improved form of releasable drive mechanism for the rotary feeder shaft.

Another object is to provide an improved form of lubricating means for the variable speed system.

Other objects and advantages of this invention will be more apparent from the following detail description of certain approved forms of apparatus constructed and operating according to the principles of this invention.

In the accompanying drawings:

Fig. 4 is a plan view of a portion of the feeder shaft drive mechanism, showing more particularly one of the releasing clutches.

Fig. 5 is a central longitudinal section through the clutch mechanism, this view being taken substantially on the line 5—5 of Fig. 6.

Fig. 6 is a transverse vertical section taken substantially on the line 6—6 of Fig. 5.

Fig. 7 is an enlarged longitudinal vertical section through the variable speed mechanism, this view being taken substantially on the line 7—7 of Fig. 1.

Fig. 8 is a transverse vertical section, on a somewhat smaller scale, taken substantially on the line 8—8 of Fig. 7.

Fig. 9 shows the mechanism adjusted for the maximum throw or swinging movement of the driven shaft, whereas Fig. 10 shows the same mechanism adjusted for the minimum or zero movement of the driven shaft.

Figure 1:
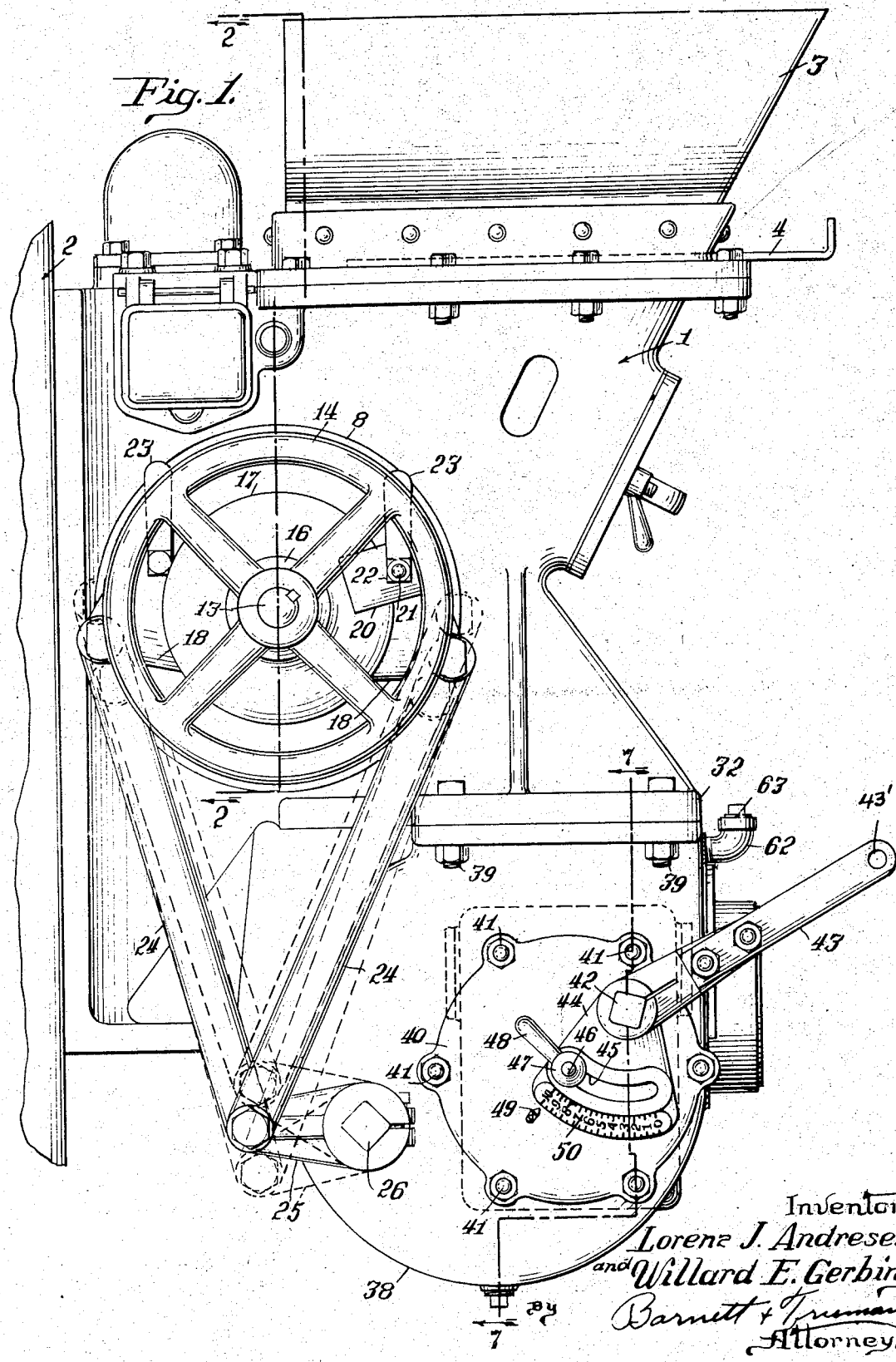
Fig. 1 is a side elevation of the assembled feeder and drive mechanism.

Referring first more particularly to Figs. 1 to 6 inclusive, the feeder casing indicated generally at 1 is secured to the side of the mill housing, a fragment of which is indicated at 2 in Fig. 1, and material introduced into the open hopper 3 at the top of the feeder is delivered, by means of the rotary feed mechanism hereinafter described, into the mill 2. In addition to the rotary feeder, a slide valve 4 and a swinging safety or release damper 5 (Fig. 3) are used to control the flow of material through the feeder. A horizontally extending rotary driven shaft 6, journaled at 7 and 7' in the end plugs 8 and 8' of housing 1, carries the rotary feeder consisting of a central spider 9 to which are secured a series of radially projecting paddles 10 revolving around the fixed central cylindrical members 11 and 11' extending inwardly from plugs 8 and 8' and abutting the spider 9 at their inner ends so that the material will be engaged in the pockets 12 between successive paddles 10 and directed from the hopper into the mill.

One outwardly projecting end portion 13 of shaft 6 carries a fixedly attached hand wheel 14 by means of which the rotary feeder can be manually rotated. A pair of one-way or "free-wheeling" clutches indicated generally at 15 and 16 are mounted on the shaft portion 13, and secured to and oscillating with the outer portion of each clutch device is a friction disk 17. An operating crank or lever 18, cooperating with clutch 16, has an annular portion 19 journaled adjacent the disk 17 of clutch 16 and is connected with a clamping plate 20 at the other side of disk 17 by means of a screw bolt 21 on the threaded end of which is mounted the nut 22 from which extends the releasing handle 23. Normally, the handle 23 will be swung in such a direction as to clamp the respective members 19 and 20 against opposite sides of disk 17 and thus secure the operating crank 18 to the outer portion of clutch 16. Under these conditions, when crank 18 is swung in one direction the clutch will cause shaft 13 to swing in the same direction, whereas the clutch will release and permit free movement of crank 18 in the opposite direction. Any suitable type of free-wheeling clutch can be used. A clutch of the ball or cam type is preferable to a ratchet or other one-way positive clutch.

An exactly similar mechanism is connected with the other clutch member 15, but this crank mechanism projects in the opposite radial direction from crank 18, and, as already stated, clutch 15 grips shaft 13 when rotated in the opposite direction from clutch 16. Consequently, on the upstroke or when both cranks 18 are raised, one of these will be operatively connected with shaft 13 and rotate it in a certain direction, for example clockwise, while the other crank will be free. On the downstroke when both cranks 18 are lowered the other crank will be operatively connected with the shaft so as to continue the same clockwise direction of shaft 13. A pair of similar links 24 connect the respective cranks 18 with the crank 25 secured on the outer end portion of the oscillatory driven shaft 26 which forms a portion of the variable-speed mechanism as hereafter described. The oscillation of shaft 26 and consequently of crank 25 (as shown in dotted lines Fig. 1) will therefore cause a substantially continuous but slow rotating movement of the feeder shaft 6.

If, at any time, the feeder should become jammed, the releasing levers 23 can be quickly turned in such a direction as to release the clutch members and permit the feeder shaft 6 to be rotated freely in either direction by means of the manual hand wheel 14. Or, obviously, this will permit the feeder mechanism to remain stationary while the driving mechanism continues to operate.

The driving motor 27 (Fig. 2) is mounted by means of bolts 28 on a supporting plate 29 pivotally suspended at 30 from a bracket member 31 extending downwardly from the base plate 32 of the feeder assembly. The motor-driven pulley 33 is connected through belt 34 with pulley 35 on the end of the worm-shaft 36. The screw-bolt 31' mounted in bracket 31 is adapted to engage the pivoted supporting plate 29 and swing the motor assembly outwardly or toward the right (Fig. 2) so as to tighten the belt 34.

The worm-shaft 36 is journaled in the upper portion of the gear casing 37 mounted on one end of the housing 38 which encloses the variable speed mechanism, said housing being supported by bolts 39 from the under face of base plate 32 of the feeder mechanism. An opening in the other end of housing 38 is closed by a cover plate 40 held in place by bolts 41, and an adjusting shaft 42 is journaled in this cover plate (see Fig. 1). An adjusting lever 43 is secured to a sector-shaped locking and indicating plate 44 fixedly mounted on the outer end of adjusting shaft 42 formed with an arcuate slot 45 through which projects the threaded stem 46 on which is mounted a locking nut 47 provided with handle 48. A spring 47' is interposed between nut 47 and a washer 48' bearing frictionally on sector 44. Nut 47 will be tightened by handle 48 until the pressure of compressed spring 47' is sufficient to hold sector plate 44 and shaft 42 in any position to which they are moved by adjusting lever 43. A fixed pointer 49 cooperates with the arcuate dial-plate 50. When the adjusting mechanism, just described, is in the position shown in Fig. 1 with the pointer 49 opposite the indication "10" on the dial, the operating throw of crank 25 will be the maximum, and the maximum rate of rotation will be imparted to the rotary-driven shaft 6 of the feeder. When adjusting lever 43 is swung in a clockwise direction so that the dial indication "0" is moved opposite the pointer 49, then there will be no operative throw of crank 25 (that is the shaft 26 will be stationary and will not oscillate) and there will be no movement imparted to the feeder-shaft 6. As the adjusting lever 43 is moved to any intermediate position, an intermediate arcuate throw or oscillation will be imparted to the shaft 26 and arm 25, and the feeder shaft 6 will be rotated at some intermediate speed. The adjusting lever 43 may be moved by any suitable automatic control mechanism connected at 43' to the outer end position of the lever. When this automatic control is used the lock-nut 47 will be turned by swinging the handle 48 to relieve the pressure of spring 47' and render the friction-lock ineffective.

Figure 2:
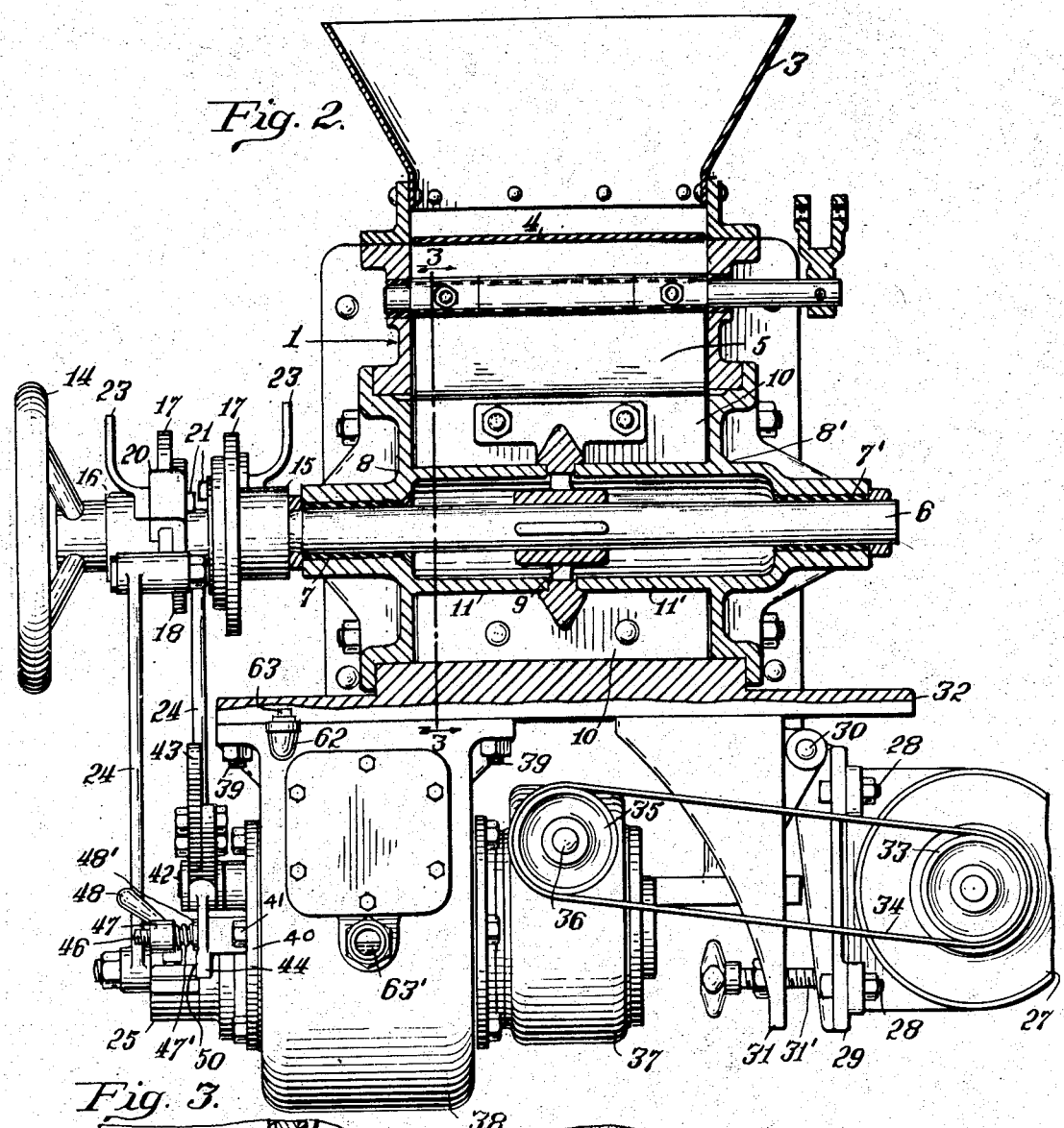
Fig. 2 is a front elevation of the same assembly, on a somewhat smaller scale, the feeder mechanism being shown in vertical section substantially on the line 2—2 of Fig. 1.
Figure 3:
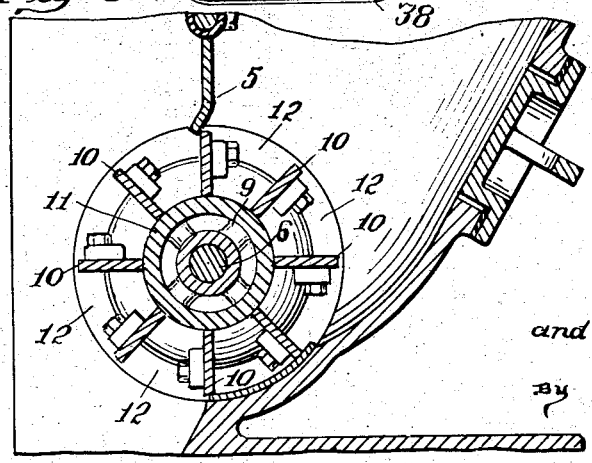
Fig. 3 is a transverse vertical section through a portion of the feeder mechanism, this view being taken substantially on the line 3—3 of Fig. 2.

The variable speed mechanism within housings 37 and 38 will now be described, referring more particularly to Figs. 7 to 10 inclusive. The worm-shaft 36 is provided with worm 51 which meshes with the worm wheel 52 keyed at 53 on the main rotary drive-shaft 54 journaled in the roller-bearings 55 and 56 mounted in gear casing 37. One end portion of shaft 54 projects through end wall 57 and packing device 58 separating gear casing 37 from housing 38 and carries the drum 59 which fits snugly but rotatably within the sleeve or bushing 60 mounted within the hollow cylindrical frame member 61. Substantially the lower half of housing 38 will be filled with a bath of oil, conveniently introduced through the inlet 62 closed by plug 63 (Figs. 1 and 2). The oil level can be observed through sight glass 63' in the end of casing 38 (Fig. 2). The inner portion of the peripheral surface of drum 59 is formed with a spiral groove 64 (Fig. 7) and the drum rotates in such a direction that this groove will tend to draw or pump oil inwardly toward the central portion of the drum. A similar spiral groove 65 (but of opposite pitch) at the other end of the drum tends to return most of this oil in the opposite direction so that the oil will be forced out through port 66 into a passage 67 formed in the cylindrical frame member 61. A branch passage 68 leads from passage 67 to a tube or conduit 69 from which extend one or more branch conduits 70, these conduits having angularly projecting end portions 71 and 72 respectively so that the oil will be discharged over certain of the upwardly projecting pivotal connections of the crank and link members hereinafter described. It will be apparent that this lubricating mechanism will operate continuously, as long as the driving shaft 54 and drum 59 are rotated in the proper direction.

Referring to Figs. 7 and 8, the adjustable fulcrum member 73 has a collar portion 74 journaled on the cylindrical frame member 61 between the side flanges 75 and 76, this fulcrum member 73 carrying in its outer end portion the horizontally extending fulcrum pin 77.

The adjusting shaft 42 (already described) projects into the housing 38 and is journaled in the tubular bearing 78 projecting inwardly from cover plate 40. On the inner end portion of shaft 42 is secured, by means of clamping collar 79, the outwardly projecting crank 80, the outer end of which is connected through pin 81 with one end of a link 82 pivoted at its opposite end at 83 to an ear 84 on fulcrum member 73 (see Fig. 8). Thus, while the fulcrum member 73 normally does not rotate, it will be swung as adjustment lever 43 is moved from one end to the other of its arcuate movement, from the maximum-throw position shown in Fig. 9 to the minimum-throw position shown in Fig. 10.

Figure 9:
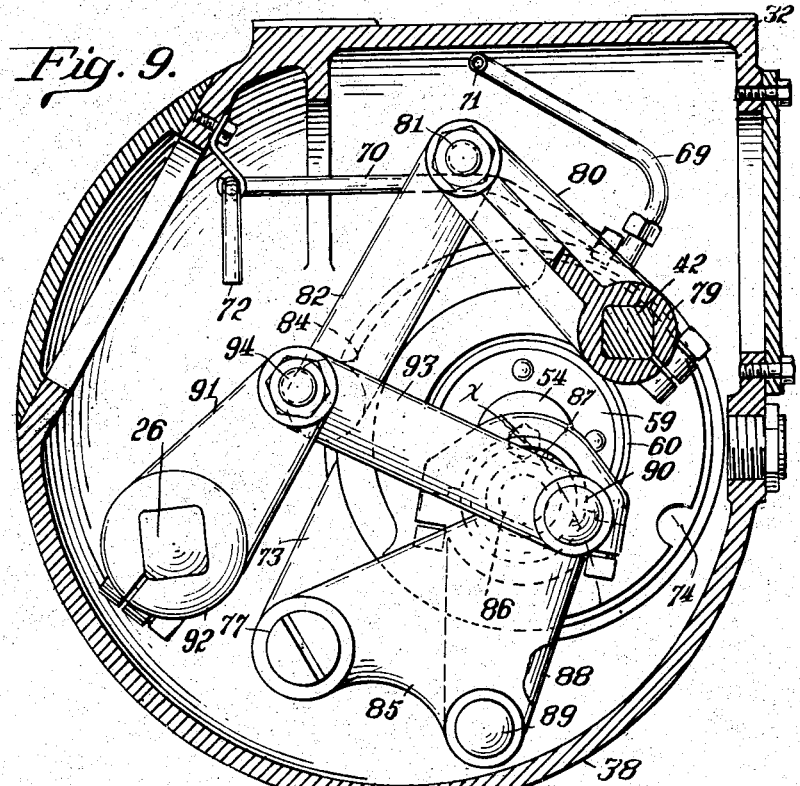
Figs. 9 and 10 are similar transverse vertical sections, each taken substantially on the line 9—9 of Fig. 7.
Figure 10:
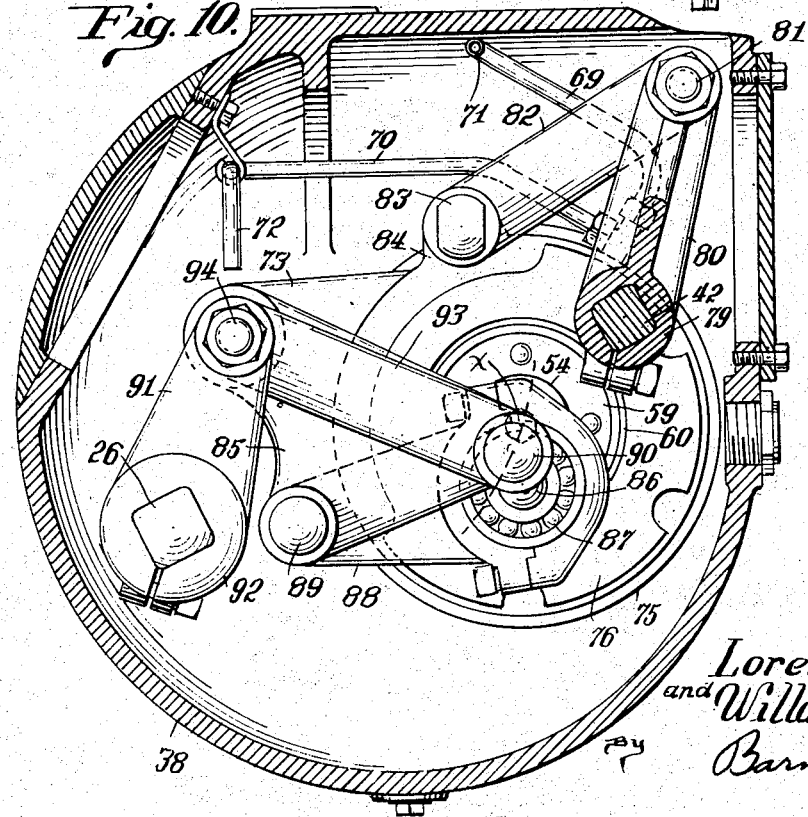

An intermediate power-transmitting lever 85, of generally triangular shape and best shown in Fig. 9, is journaled on the fulcrum pin 77. A crank-pin 86 projecting eccentrically from the exposed inner end of drum 59 on driving-shaft 54, is journaled through ball bearing 87 in the upper end of a link or pitman 88 the other end of which is connected by pivot pin 89 with a laterally projecting intermediate corner portion of the triangular-shaped power-transmitting lever 85. It will thus be seen that as crank pin 86 is revolved around the axis x of shaft 54, the resulting reciprocating movement of link or pitman 88 will cause the power-transmitting lever 85 to swing about the fulcrum-pin 77, and this swinging movement will be the same and of the same amplitude regardless of the position to which fulcrum-pin 77 is adjusted around the axis of rotation x of drive shaft 54. A pivot pin 90 in the opposite end portion of swinging lever 85 is so positioned that the distance between the central axes of pins 77 and 90 is the same as the distance between the central axis of pin 77 and the axis x of the driving shaft, and as a consequence the pin 90 will always be swung through an arc extending through the driving axis x, as indicated by the dotted arcuate lines in Figs. 9 and 10.

A crank 91 is secured by means of clamping collar 92 on the inner end portion of the driven shaft 26 (already described). A link 93 is pivotally connected at one end through pivot pin 94 with the outer end of crank 91, and is pivotally connected at the other end with power transmitting lever 85 through the pivot pin 90. The length of link 93 between the central axes of pivot pins 90 and 94 is the same as the distance between the axis of fulcrum pin 77 and the central axis x of the driving shaft. As a consequence, when the fulcrum pin 77 is moved to the position indicated in Fig. 10 the axes of fulcrum pin 77 and pivot pin 94 will coincide or be in alignment. In consequence, the axis of pivot pin 90 will not only swing in an arc through the axis x, but will also swing about the axis of pin 94 as a center and no movement whatever will be imparted to the crank arm 91 and driven shaft 26. This will be the operation when the adjusting lever 43 is moved to its lower extreme position so that pointer 49 is opposite the character "0" on dial 50 (see Fig. 1). On the other hand, if adjusting lever 43 is moved to the extreme position shown in Fig. 1 with the pointer 49 opposite the numeral "10" on the dial, then the fulcrum pin 77 will be moved to the other extreme position shown in Fig. 9. At this time the pivot pin 90 will still swing in an arc extending through the axis x of the driving shaft, but this arc will now approach parallelism with the link 93 so that this link will be moved longitudinally and will impart a maximum swinging movement to the crank arm 91 and driven shaft 26. Obviously, any intermediate positioning of the adjusting means will cause the driven shaft to oscillate in a correspondingly smaller arc. Furthermore, the amplitude of swinging movement of driven shaft 26 and crank arm 25 thereon (Fig. 1) will determine the magnitude of movement of the links 24 and crank arms 18 and consequently the speed of rotation of the driven speed shaft 6.

While this improved variable speed and reducing gear is designed especially for use with a mill-feed mechanism of the type first described, it will be obvious that it could be used in a similar manner for driving other types of mechanism.

We claim:

1. A variable speed mechanism comprising a driving shaft, means for rotating the driving shaft at a substantially constant speed, a driven shaft adapted to be oscillated through an arc varying from zero degrees to a predetermined maximum, a crank fixed on the driven shaft, a fulcrum-member pivoted about the axis of the driving shaft and carrying a fulcrum-pin spaced from the axis, a power-transmitting lever pivoted on the fulcrum-pin, means connecting the driving shaft and lever for oscillating the lever through a predetermined arc as the shaft is rotated, a link pivotally connected at one end to the driven crank and pivotally connected at its other end to the power-transmitting lever at a point that swings through the axis of the driving shaft, the distance between the two end axes of the link being the same as the distance between the axes of the fulcrum-pin and the driving shaft, and means for adjusting the fulcrum member about the axis of the driving shaft from a minimum drive position when the axis of the fulcrum pin coincides with the axis of connection between the driven crank and link to a maximum drive position when these last mentioned axes are most remote from one another.

2. A variable speed mechanism comprising a driving shaft, means for rotating the driving shaft at a substantially constant speed, a driven shaft adapted to be oscillated through an arc varying from zero degrees to a predetermined maximum, a crank fixed on the driven shaft, a fulcrum member pivoted about the axis of the driving shaft and carrying a fulcrum-pin spaced from the axis, a power-transmitting lever pivoted on the fulcrum-pin, means connecting the driving shaft and lever for oscillating the lever through a predetermined arc as the shaft is rotated, said means comprising a crank-pin on the driving shaft and a link connecting this pin with a point on the power-transmitting lever spaced from the fulcrum-pin, a link pivotally connected at one end to the driven crank and pivotally connected at its other end to the power-transmitting lever at a point that swings through the axis of the driving shaft, the distance between the two end axes of the link being the same as the distance between the axes of the fulcrum-pin and the driving shaft, and means for adjusting the fulcrum member about the axis of the driving shaft from a minimum drive position when the axis of the fulcrum-pin coincides with the axis of connection between the driven crank and link to a maximum drive position when these last mentioned axes are most remote from one another.

3. A variable speed mechanism comprising a driving shaft, means for rotating the driving shaft at a substantially constant speed, a driven shaft adapted to be oscillated through an arc varying from zero degrees to a predetermined maximum, a crank fixed on the driven shaft, a fulcrum member pivoted about the axis of the driving shaft and carrying a fulcrum-pin spaced from the axis, a power-transmitting lever pivoted on the fulcrum-pin, means connecting the driving shaft and lever for oscillating the lever through a predetermined arc as the shaft is rotated, a link pivotally connected at one end to the driven crank and pivotally connected at its other end to the power-transmitting lever at a point that swings through the axis of the driving shaft, the distance between the two end axes of the link being the same as the distance between the axes of the fulcrum-pin and the driving shaft, means for adjusting the fulcrum-member about the axis of the driving shaft from a minimum drive position when the axis of the fulcrum-pin coincides with the axis of connection between the driven crank and link to a maximum drive position when these last mentioned axes are most remote from one another, said last mentioned means comprising an oscillating shaft, an adjusting lever for swinging this shaft, means for locking said lever in selected positions of adjustment, a crank on the shaft, and a link connecting this crank with a portion of the fulcrum-member.

4. A variable speed mechanism comprising a driving shaft rotating at a substantially constant speed, a driven member adapted to be oscillated through an arc variable from a minimum to a maximum amplitude, a crank fixed on the driven member, a fulcrum-member pivoted about the axis of the driving shaft, a power-transmitting lever, a fulcrum-pin for pivoting the lever on the fulcrum member at a point spaced from the axis of the driving shaft, means connecting the driving shaft and power-transmitting lever for oscillating the lever through a predetermined arc as the shaft is rotated, a link pivotally connected at one end to the driven crank and pivotally connected at its other end to the power-transmitting lever at a point that swings through an arc extending through the axis of the driving shaft, and means for adjusting the fulcrum-member about the axis of the driving shaft from a position where the arc of oscillation of the driven member is a minimum to a position where this arc is a maximum.

5. A variable speed mechanism comprising a driving shaft rotating at a substantially constant speed, a driven member adapted to be oscillated through an arc variable from a minimum to a maximum amplitude, a crank fixed on the driven member, a fulcrum-member pivoted about the axis of the driving shaft, a power-transmitting lever, a fulcrum-pin for pivoting the lever on the fulcrum member at a point spaced from the axis of the driving shaft, means connecting the driving shaft and power-transmitting lever for oscillating the lever through a predetermined arc as the shaft is rotated, a link pivotally connected at one end to the driven crank and pivotally connected at its other end to the power-transmitting lever at a point that swings through an arc extending through the axis of the driving shaft, and means for adjusting the fulcrum-member about the axis of the driving shaft from a minimum drive position when the path of movement of the pivotal connection between the lever and link is most nearly at right-angles to the longitudinal center line of the link to a maximum drive position where said path is most nearly parallel with said center line.

LORENZ J. ANDRESEN.
WILLARD E. GERBING.